United States Patent [19]

Gainforth

[11] Patent Number: 5,514,020

[45] Date of Patent: May 7, 1996

[54] BUOYANT CHILD SAFETY SEAT FOR BOATS

[76] Inventor: Anne M. Gainforth, 7448 Sandy Pines, Myrtle Beach, S.C. 29575

[21] Appl. No.: 405,306

[22] Filed: Mar. 16, 1995

[51] Int. Cl.⁶ .................................................. B63C 9/30
[52] U.S. Cl. ............................................ 441/126; 441/80
[58] Field of Search .................................. 441/126, 130, 441/80, 88, 129, 114; 297/484, 485, 250.1, 253, 250.17, 464, 473, 468, 482, 483; 114/363; 5/655

[56] References Cited

U.S. PATENT DOCUMENTS

| | | | |
|---|---|---|---|
| 3,099,486 | 7/1963 | Scott | 297/485 |
| 3,103,385 | 9/1963 | Grieco | 297/253 |
| 4,099,770 | 7/1978 | Elsholz et al. | 297/250.1 |
| 4,725,253 | 2/1988 | Politte | 441/130 |
| 4,798,551 | 1/1989 | Dumonceaux et al. | 441/130 |

Primary Examiner—Edwin L. Swinehart

[57] ABSTRACT

A child- or infant-sized safety seat is disclosed with relatively horizontal seat and relatively vertical back support elements designed with flotation effecting materials sufficient to keep said child or infant at the water's surface and with critically positioned and apportioned (relative to the weight of the back and seat support elements and the anticipated weight of the child) counter-weight effecting materials to result in that portion of the vertical back support element supporting the child's head and shoulders well above the water's surface. The safety seat is preferably constructed by injecting a semi-rigid, resilient polyurethane foam into a die cast mold into which the weight materials have been pre-positioned to result in the up-righting of the safety seat at the water's surface, and the foam, upon rising and curing, forms around the weighted material to fix its position.

16 Claims, 2 Drawing Sheets

BUOYANT CHILD SAFETY SEAT FOR BOATS

BACKGROUND OF THE INVENTION

1. Field of the Invention

The present invention is directed to a child or infant seat, and particularly to a child's safety seat for use on a water craft, such as a boat. Specifically, this invention is related to a child's seat for use on a boat which seat is designed such that, in the event of being accidentally thrown in the water, the seat device automatically uprights itself with the child's head and shoulders positioned above the surface of the water.

2. Brief Description of the Prior Art

While seating devices and buoyancy devices on board boats are well known, they commonly are provided as simple transverse bench-type seats or padded seats with back supports and floatable, padded seat cushions or individual flotation vests. Various seating apparatus for boats are described in the prior art. U.S. Pat. No. 4,709,648 discloses a boat seat bracket for mounting a seat assembly upon an elongated horizontal transverse bench seat of a fishing boat permitting the seat assembly to shift (slide) transversely across the bench seat and permitting the seat assembly to shift to a stored position by swinging, relative to the bench seat, between an operative position overlying and supported from the bench seat and an inoperative position forwardly and downwardly toward the associated boat bottom. U.S. Pat. No. 4,934,303 teaches a convertible bolster/seat for recreational boats. U.S. Pat. No. 5,119,754 describes a boat seat stabilizing apparatus. U.S. Pat. No. 5,309,861 discloses a shock-absorber mounted seat for personal watercraft and boats. Also, U.S. Pat. No. Des. 254,345 shows an ornamental design for a boat seat, and U.S. Pat. No. Des. 303,878 shows a design for a foldable seat for use primarily in a boat. Additional child seating devices are taught in U.S. Pat. Nos.: Des. 151,317 (design for a child's chair); Des. 332,877 (child's bicycle seat); and Des. 349,412 (sport seat).

It remains, however, that if a watercraft or boat equipped with any of the above-described devices is subjected to rough water or is involved in an accident which results in a small child or infant residing in one of these devices being swept from the boat into the water, none of the known devices would insure the child's safety in the water. None of these previously known devices include the combination of structural features necessary to provide a safe seat for a young child or infant which, in the event the occupied seat is accidentally thrown overboard, will hold or float the infant's head and shoulders above the water for an extended period of time until a rescue can be made. This, then, is the object of the instant invention.

SUMMARY OF THE INVENTION

The above-stated object of this invention is achieved by the construction of a young child- or infant-sized safety seat with relatively horizontal seat and relatively vertical back support elements designed with flotation effecting materials sufficient to keep said child or infant at the water's surface and with critically positioned and apportioned counterweight effecting materials to result in that portion of the vertical back support element supporting the child's head and shoulders positioned well above the water's surface. The safety seat preferably is constructed by injecting a semirigid, pliable polyurethane foam into a die cast mold into which the weight materials have been pre-positioned to result in the up-righting of the safety seat at the water's surface, and the foam, upon rising and curing, forms around the weighted material to fix its position.

DESCRIPTION OF THE PREFERRED EMBODIMENT(S)

Figure 1:
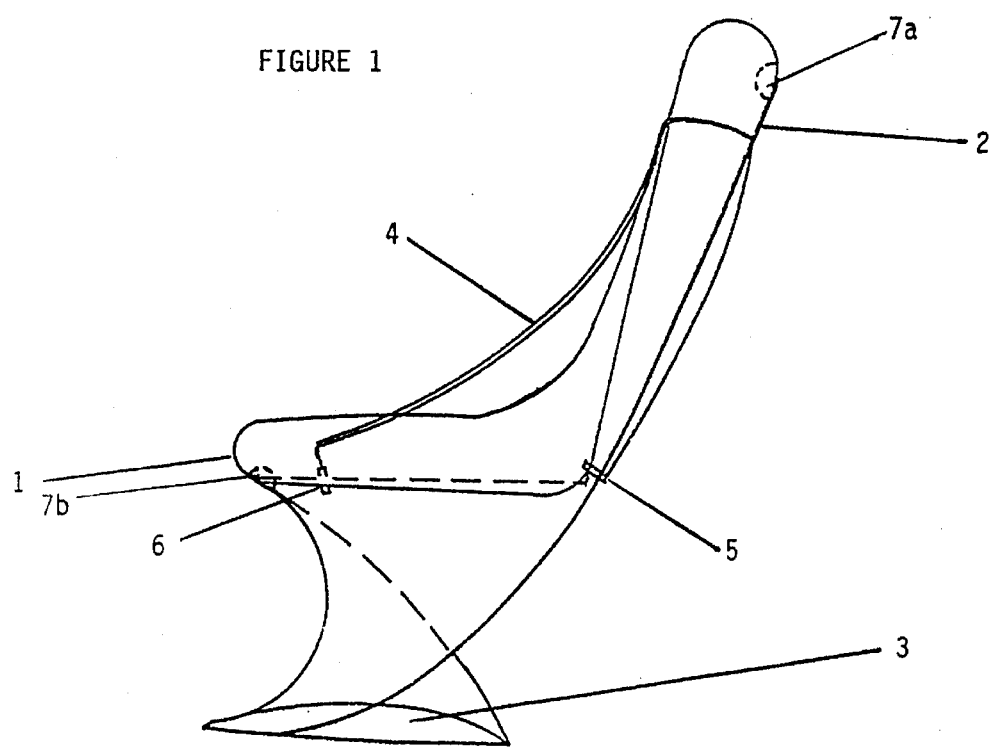
FIG. 1 depicts a side view of the safety seat device showing the relative positioning of the weight effecting material to the horizontal and vertical elements of the seat, as well as the front and rear child support straps (safety harness) attachments.

The development of this invention grew out of concern for the security of infants and small children aboard a watercraft, such as a boat, canoe, raft, pontoon, etc. There was perceived to be a need to contain an infant/child from moving about on a fast moving boat to prevent injuries which may result from such movement. Moreover, if the boat is subjected to rough water or is involved in an accident which results in the infant/child being swept overboard into the water, conventional flotation aids often (a) may not be employed (or the child has slipped out of it) or (b) the conventional device may not fit properly and becomes separated from the child on hitting the water (especially in the case of infants). Therefore, a need was seen for a device which will prevent an infant/child from moving about by comfortably containing the child in one position while the operator maneuvers the boat through the water. Also, a need was seen for a child containment device which, upon being swept into the water, will both float and position the child therein such that the child's head is above the water's surface. The additional safety benefit of such a device is precluding the boat operator from being distracted by having to worry about the location and activities of the child and allowing his/her attention to be directed to the piloting responsibilities.

Thus, the primary function of the invention safety seat device is to prevent drowning. A secondary function of the invention safety seat device is to protect against accidental injuries (bumps and bruises) resulting from irregular movements of the watercraft. The particular design and construction of the device which accomplishes these functions also provide other benefits which are noted below.

The experimentation involved in the development of the claimed invention included various fabrications. Such fabrications involved attaching to a conventional plastic infant/child seat/carrier several pieces of different sizes of flotation effecting material in the form of soft polyurethane foam and various sizes of weight effecting material. The fabrications also were fitted with containment harnesses to secure the infant/child. Testing was accomplished by placing weighted dolls of different sizes in the fabricated device and tossing it into a swimming pool. Observations were made regarding (a) the flotation material employed, (b) the weights employed, (c) the positioning of the latter with respect to the former, and (d) the sizes and weight of dolls used in relation to the performances of the devices as to ability and efficiency of uprighting in the water and in relation to the percentage of the uprighted device which appeared above the water's surface.

The results of such experimentation determined several factors to be critical to the successful performance of the invention device:

1. To orient the device in an upright position in the water, the weight effecting material must be below the center of gravity of the device and should be positioned along its longitudinal axis;

2. The buoyancy of the flotation material must be sufficient to float the device (inclusive of its weight effecting material and its infant/child occupant) on the water's surface; and 3. To effect the function of the device, the desirable weight ratio of flotation effecting material to weight effecting material is, respectively, about 0.75–1.5:1, preferably about 1:1.

The invention safety seat may best be understood in relation to the drawings. The side perspective of FIG. 1 shows the relatively horizontal seat support element 1 and the relatively vertical back support element 2, each of which are shown with a uniform flotation effecting material (foam) exterior. (Various embodiments of the combination of these elements forming the infant/child support structure for the device are envisioned. The entire support structure may be formed of a rigid or semi-rigid polyurethane foam, or a rigid, a semi-rigid, or a soft polyurethane foam may be formed around a metal or polyvinyl chloride (pvc) type plastic frame or core structure.) FIG. 1 also shows the relative positioning of these elements (1 and 2) with respect to the weight effecting material (metal weights) 3 near the bottom of the safety seat device. Finally, FIG. 1 shows the child securing safety harness 4 and the rearward attachment 5 of the harness as well as its forward attachment 6.

The flotation effecting material preferably is a foam material and, most preferably, is a polyurethane foam, which is a 97–99% closed cell structure which does not absorb (or is not otherwise affected by) water. However, a device considered to be within the scope of this invention could employ other flotation effecting materials to include, but not limited to, cork, balsa, contained gases, etc. The weight effecting material of the invention preferably is one or more of several metals including, but not limited to, lead, steel, iron, etc. However, a device considered to be within the scope of this invention could employ other weight effecting materials to include, but not limited to, sand, rock, portland (or other type) cement, etc.

Figure 2:
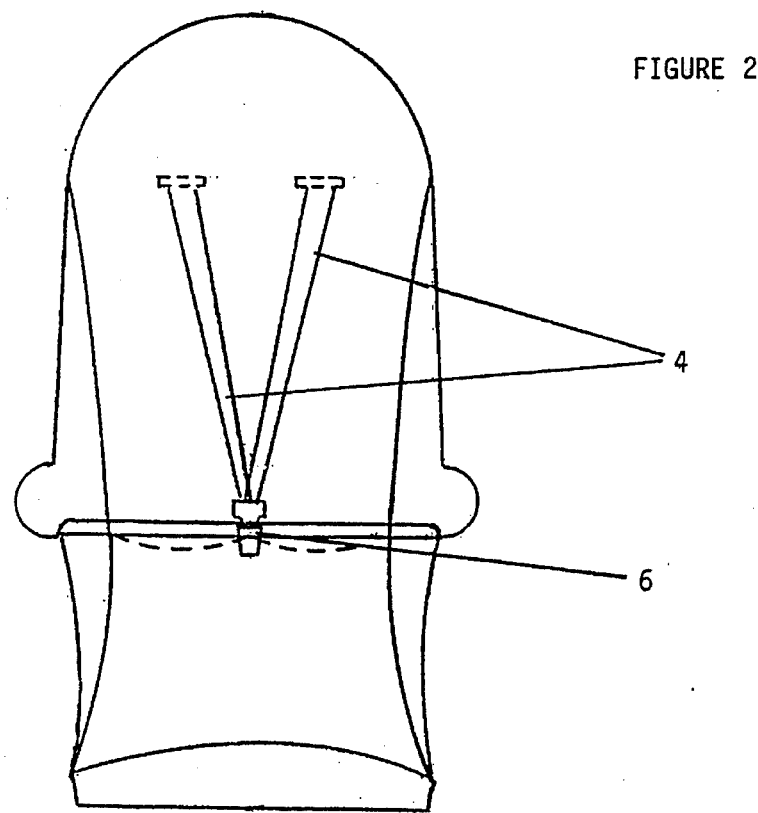
FIG. 2 shows a front view of the safety seat showing the forward attachment of the safety harness.

The safety harness 4 may be made of various fabric materials of natural or synthetic origin noted for their strength, such as nylon, cotton, polyurethane, etc. Typically, the straps will be provided with some means of adjustment to accommodate a range in size of children. Also, the straps will secure the infant/child by having separate elements positioned near the top of the back support element above each shoulder of the infant/child and terminating at a common location central to the front of the seat support element at forward attachment 6, as depicted in FIGS. 1 and 2. In a preferred embodiment, the strap elements positioned above the child's shoulders will pass through the back support element and terminate at a secure point in the rear of the device either along the rear of the back support element or at a central point where the rear of the seat support element intersects with the bottom of the back support element at rearward attachment 5, as depicted in FIG. 1.

As noted in FIGS. 1 and 2, the device preferably is provided with at least one elongated horizontal indention which serve as a handle, or hand hold, for carrying the device. In a preferred embodiment, the device will be provided with such indention 7a near the top rear of the back support element and a second such indention 7b near the front edge of the underside of the seat support element.

Figure 3:
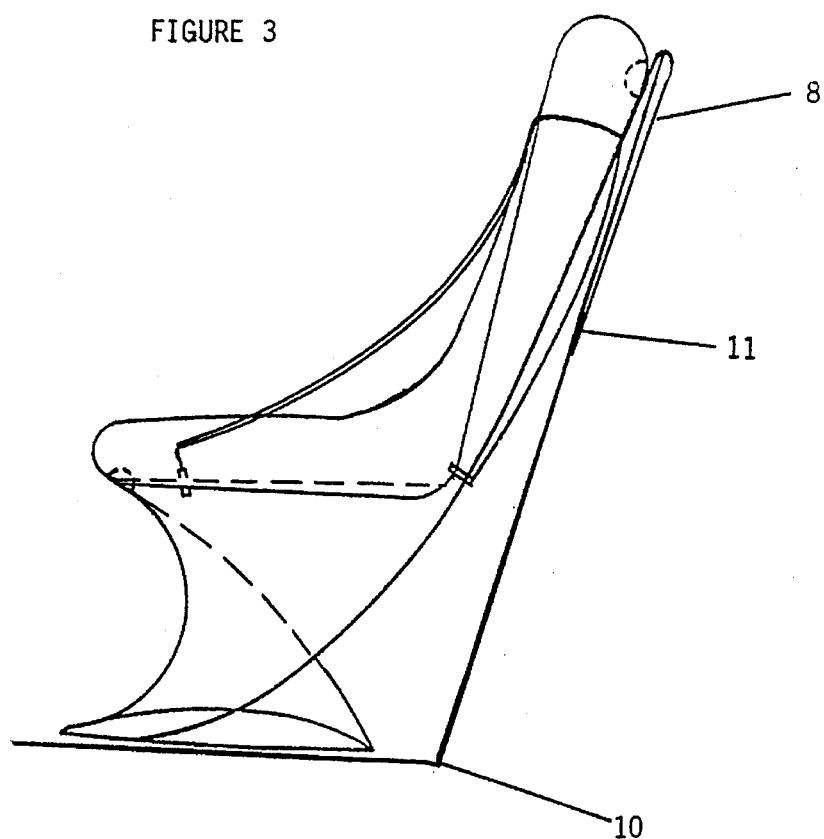
FIG. 3 depicts a side view of the safety seat device additionally showing the means for stabilizing the safety device when resting in (or on) a boat seat.
Figure 4:
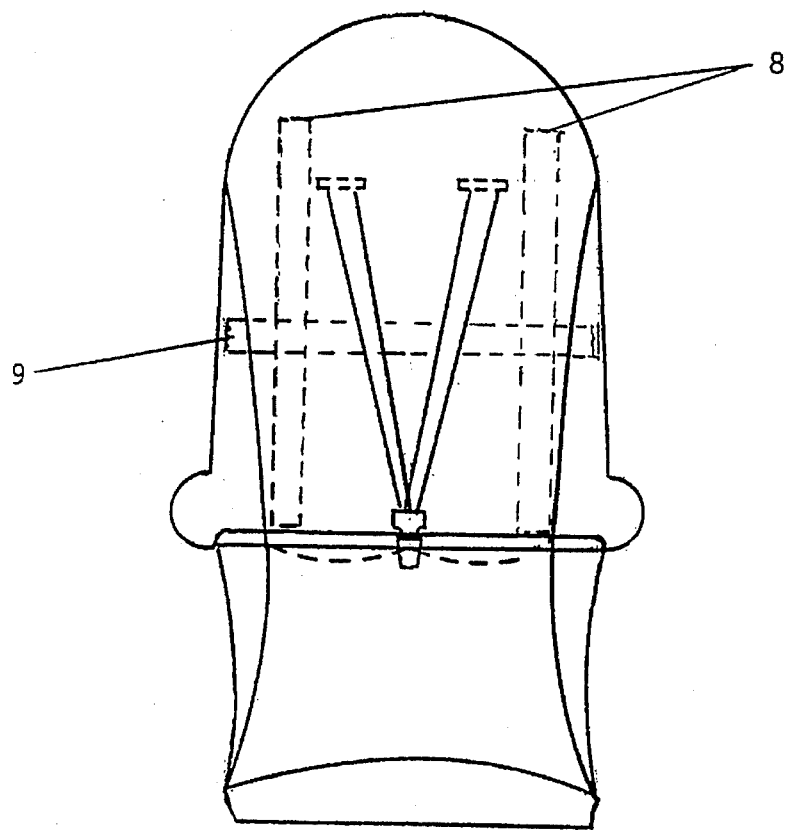
FIG. 4 shows a front view of the safety seat and indicating the positioning of stabilizing straps on the backside of the safety device for securing same to alternative types of boat seats.

Also, embodiments of the invention device may provide means for stabilizing the safety seat device on board a boat. The best mode of such stabilization means is in the form of straps attached to the backside of the device as indicated in FIGS. 3 and 4. FIG. 3 depicts the device positioned in a bench type boat seat 10 wherein on or more vertical straps 8 are provided with one end attached to the back of the safety seat and having an attachment means 11 at the other end for securing said strap or straps to the back of the bench seat fixed in the boat. Various known means of attachment may suffice, but the preferred attachment means is the hook-and-loop fabric commonly known as VELCRO®. FIG. 4 depicts multiple vertical straps 8, as well as the provision of a horizontal strap 9 for stabilizing the invention device in a bucket type boat seat.

In a preferred embodiment, the safety seat is constructed by injecting a semi-rigid, pliable polyurethane foam into a die cast mold in which the weight material has been pre-positioned to result in the up-righting of the safety seat at the water's surface, and the foam, upon rising and curing, forms around the weighted material to fix its position. The proportion (weight ratio) of foam material to weight material may be somewhat dependent on the buoyancy factor of the foam. Ideally, the safety device will cause the head and shoulders of a child of up to 35 pounds to be positioned above the water's surface. With alternative flotation effective materials, only a minimum of experimentation should be necessary to determine the optimum ratio. Also, with a minimum amount of experimentation, it is envisioned that optimum flotation/weight ratios (by weight) can be determined to tailor safety seat devices specific to infants or older children of particular weight ranges.

Although the present invention has been described in terms of specific embodiments, it is anticipated that alterations and modifications thereof will no doubt occur to those skilled in the art. It is intended, therefore, that the following claims be interpreted as covering all such alterations and modifications as fall within the true spirit and scope of the invention.

What is claimed is:

1. A flotation safety seating device comprising a relatively horizontal seat support element and a relatively vertical back support element each of which are at least partially constructed of a flotation effecting material and further comprising weight effecting material approximately centrally positioned below the seat support clement in an amount in proportion to the flotation effecting material to result in causing the safety seating device to be in an upright position when floating in water with at least the upper one-fourth of the back supporting element above the water's surface wherein the weight ratio of the seat and back support elements to the weight material is about 0.75–1.5:1, respectively.

2. The flotation device of claim 1. wherein the flotation effecting material is polyurethane foam.

3. The flotation device of claim 1 wherein the weight effecting material is in an amount in proportion to the flotation effecting material to result in causing the safety seating device to be in an upright position when floating in water with at least the upper one-third of the back supporting element above the water's surface.

4. The flotation device of claim 3 wherein the weight ratio of the seat and the back support elements to the weight material is about 1:1.

5. The flotation device of claim 1 wherein the flotation effecting material is selected from the group consisting of foam, cork, balsa, contained gases, and any combination thereof.

6. The flotation device of claim 1 wherein the weight effecting material is selected from the group consisting of metal, sand, rock, cement, and any combination thereof.

7. The flotation device of claim 5 wherein the foam is polyurethane foam.

8. The flotation device of claim 6 wherein the metal is lead.

9. The flotation device of claim 1 further comprising a safety harness structure for securing a child positioned within the device, said harness comprising separate strap elements positioned near the top of the back support element above each shoulder of the child and terminating at a common point central to the front of the seat support element.

10. The flotation device of claim 1 further comprising a means for stabilizing the device within a boat seat.

11. The flotation device of claim 10 wherein the boat seat is a bench seat.

12. The flotation device of claim 11 wherein the stabilization means comprises at least one vertical strap one end of which is attached to the backside of said device and having an attachment means at the other end for securing to the back of said seat.

13. The flotation device of claim 12 wherein the attachment means is provided by a hook-and-loop fabric.

14. The flotation device of claim 10 wherein the boat seat is a bucket seat.

15. The flotation device of claim 14 wherein the stabilization means comprises at least one horizontal strap one end of which is attached near one side edge of the backside of said device and having an attachment means at the other end such that, by passing the strap behind the back of the seat and securing the attachment means to the other side edge of the backside of said device, the device is stabilized in said seat.

16. The flotation device of claim 15 wherein the attachment means is provided by hook-and-loop fabric.

* * * * *